(12) United States Patent
Bloomer

(10) Patent No.: US 6,406,508 B1
(45) Date of Patent: Jun. 18, 2002

(54) TORSIONAL SNAP FIT CONNECTOR FOR AIR FILTER COVER

(75) Inventor: Stephen F. Bloomer, London (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/664,809

(22) Filed: Sep. 19, 2000

Related U.S. Application Data

(60) Provisional application No. 60/158,182, filed on Oct. 7, 1999.

(51) Int. Cl.[7] .............................................. B65D 21/02
(52) U.S. Cl. ........................ 55/385.3; 55/490; 55/493; 55/510; 55/511; 123/198 E; 24/287; 24/288
(58) Field of Search ........................ 55/490, 493, 497, 55/508, 510, 511, 515, 385.1, 385.2, 385.3; 123/198 E; 24/287, 288

(56) References Cited

U.S. PATENT DOCUMENTS

| | | | |
|---|---|---|---|
| 3,825,110 A | 7/1974 | Halbich | |
| 4,743,281 A | * 5/1988 | Kennedy et al. | ............... 55/493 |
| 4,782,561 A | 11/1988 | Hayama | |
| 5,295,602 A | 3/1994 | Swanson | |
| 5,613,759 A | * 3/1997 | Ludwig et al. | ............ 55/385.2 |
| 5,947,462 A | 9/1999 | Roussel | |

* cited by examiner

*Primary Examiner*—Duane Smith
*Assistant Examiner*—Minh-Chau T. Pham

(57) ABSTRACT

A structure for securing the top and bottom cover portions of an air filter includes a wing member secured to the bottom cover portion. The wing member is attached to the cover portion through a post. The wing member has a wedged surface which is selectively moved along a wedged surface on a slot in the upper cover surface. The wedged surfaces cam the wing member to pivot. Once the wing member has moved through the slot, it is biased back and in a direction opposed to the rotation caused by the wedged surfaces. The wing member is thus secured on a surface on the upper cover member adjacent the slot. The wing member thus secures the two cover members in a snap fit connection. To release the snap fit connection, one merely biases the wing member in an opposed direction.

8 Claims, 2 Drawing Sheets

TORSIONAL SNAP FIT CONNECTOR FOR AIR FILTER COVER

This application claims priority to provisional application No. 60/158,182 filed Oct. 7, 1999.

BACKGROUND OF THE INVENTION

This invention relates to an improved cover, which may be utilized for an air filter to provide a resilient snap fit.

As is known, air filters are utilized to filter the air passing from a source of air to a vehicle engine. Typically, the air filter is captured between an upper cover and a lower cover. The two covers are secured together in some fashion. Typically, wing bolts having threaded nuts secured onto the bolts hold the two cover portions together.

However, as is known, the vehicle engine is subject to a good deal of vibration. Thus, the wing nut connection has not always provided a good connection over time. Moreover, it is relatively time consuming to remove the nut and then resecure the nut.

SUMMARY OF THE INVENTION

In a disclosed embodiment of this invention, an air cleaner upper cover is secured to a lower cover by a snap fit connection. More preferably, the snap fit connection includes at least one wing member having a wedged surface, which extends through a wedged surface slot in the other cover member. The two cover members are aligned with the slot in the one cover member aligned with the wedged wing surface. As the wing surface moves through the slot, the two wedges on the slot and the wing cam the wing away from the slot wedge surface. Once the wing portion has moved through the slot, the wing twists back over the surface adjacent the slot.

Most preferably, the wing portion is provided on a post, and the post extends through the slot after the wing has moved entirely through the slot. This post receives a torsion force as the wing is being cammed through the slot. This torsion force returns the wing to a relaxed position once it has passed through the slot. In a most preferred embodiment of this invention, the wing has wedge surfaces spaced on opposed sides of the post, as does the slot. In this way, surfaces on both sides of the post are applying a torsion force to the post as the wing moves through the slot.

The present invention thus provides a resilient snap fit connection for holding two cover portions together. Most preferably, the two cover portions secure a filter element for a vehicle engine.

To remove the cover portions the wing is simply turned in an opposed direction, similar to that achieved by the wedge surface in the slot. The two cover portions may then be moved away from each other with the wing portion moving through the slot.

These and other features of the present invention can be best understood from the following specification and drawings. The following of which is a brief description.

DETAILED DESCRIPTION OF A PREFERRED EMBODIMENT

Figure 1:
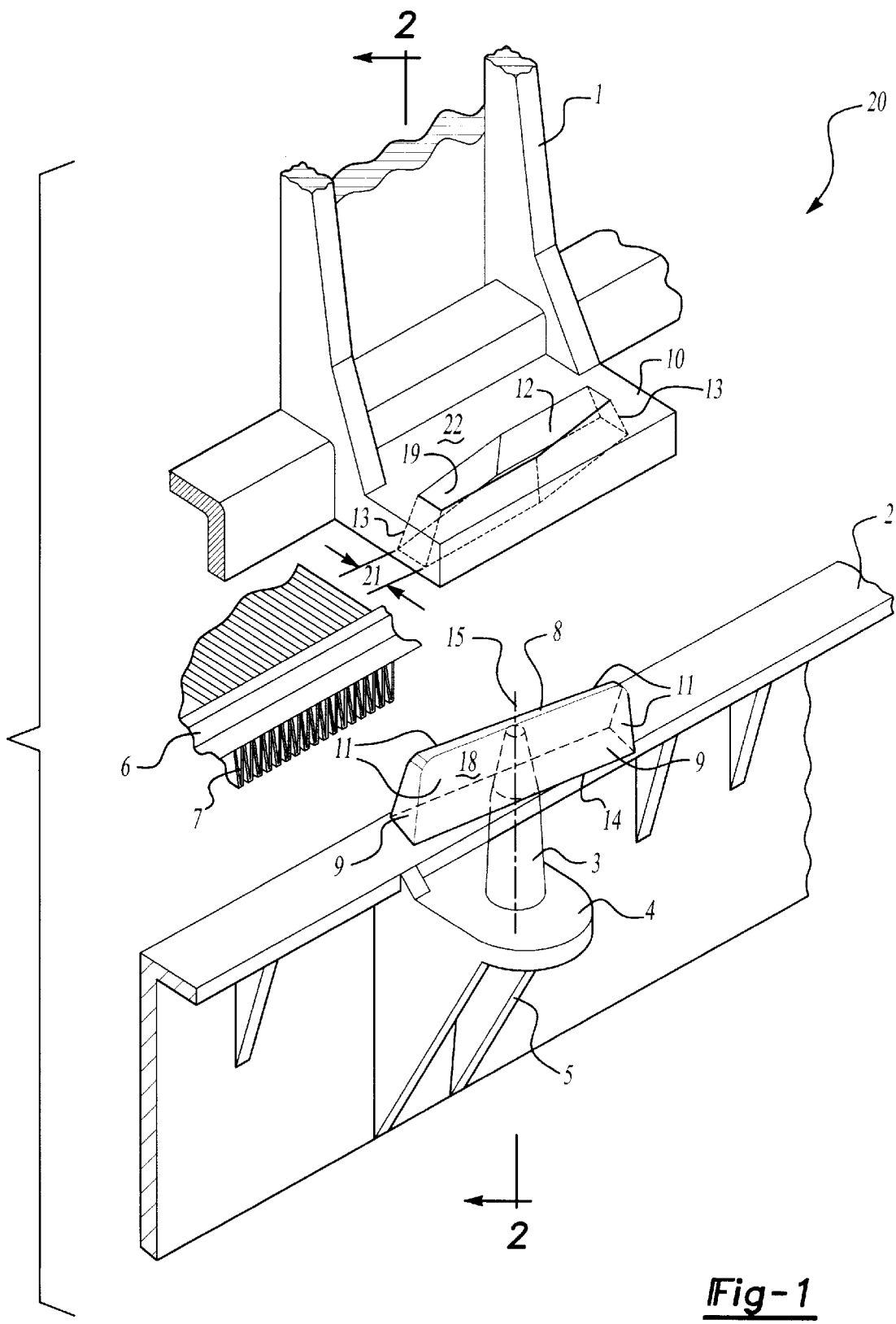
FIG. 1 is a perspective view showing the main components of the inventive cover mechanism.

As shown in FIG. 1, a filter assembly 20 has a top cover portion 1 secured to a bottom cover portion 2. A post 3 is formed off of a flange 4 attached by gussets 5 to the body of the lower cover 2. A filter seal 6 and a filter element 7 are positioned on the lower cover 2. The upper cover 1 is removable from the lower cover portion, and may pivot, or may be movable in any other known direction.

A wing 8 is secured to the post 3, and has a pair of wing portions 9. A slot flange 10 in the upper cover 1 has a slot 12 to receive a wedged surface 11 from the wing portions 9. Wedged portions 11 move through slot 12, which has mating wedged portions 13. A bottom end 14 of the wing 8, will sit atop overlap surfaces 22 once the wing has moved through the slot. An axis 15 of the post 3 receives torsion as the wing is pivoted by the wedged surfaces. Flat surfaces 18 on the wing 8 are formed on an opposed face of the wing portions 9 from the wedged surfaces 11. Similarly, flat surfaces 19 are formed in the slot 12 on opposed surfaces from the wedges 13.

As can be seen, a dimension 21 of the slot 12 is sufficient to receive the width of the wing portions at their lower most extent.

Figure 2:
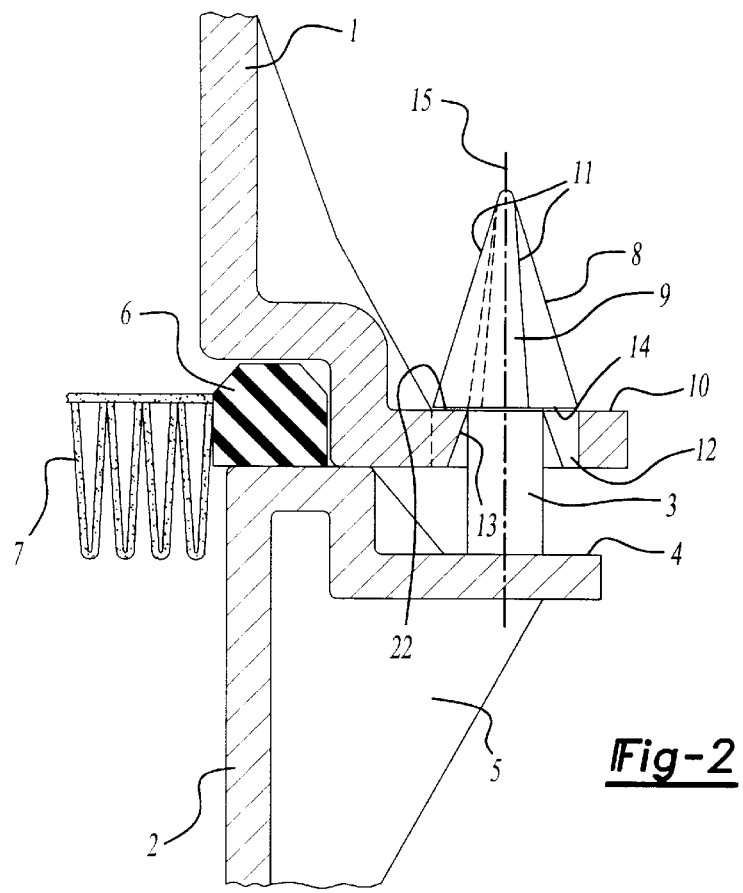
FIG. 2 is an assembled cross-sectional view.

As shown in FIG. 2, when the upper portion 1 is mounted onto the lower portion 2, the wing 8 has moved through the slot 12. Wedged surfaces 13 have cammed the wedge surface 11 from the wing portions 9. This causes the wing portions 9 to pivot relative to the central axis 15. This causes a torsion force in the post 3. Once the wing 9 has moved through the slot 12, the wing portions 9 pivot back due to the torsion built up in the post 3. The wedged portions 11 of the wing portions 9 thus overlap the overlap areas 22 on the slot flange 10 of the upper part 1. As shown in this figure, it can be appreciated that to remove the wing portion 8, the wing portions are merely pivoted in the same direction as cammed by the wedged surfaces, at which time the upper cover 1 can be removed from the lower cover 2.

Figure 3:
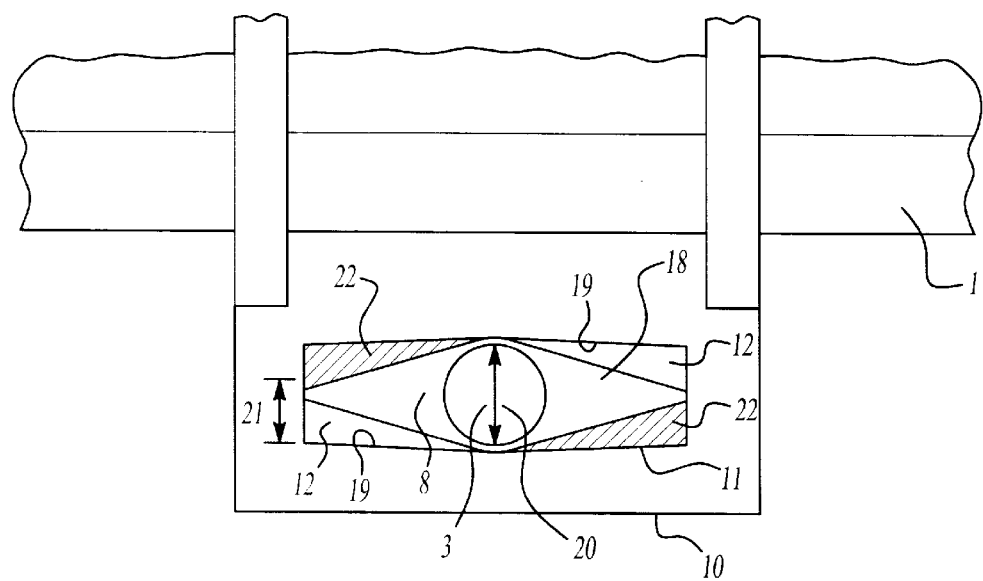
FIG. 3 is a top view showing portions of the snap fit connection.

FIG. 3 is a top view showing the overlap areas 22 covered by the wedged surfaces 11 of the wing portions 9. As can be seen, there is clearance forward of the flat portions 19 such that should one pivot the wing portions 9 counterclockwise as shown in FIG. 3, the slot 12 may then be moved off of the winged portions.

The present invention provides a simple and secure way for securing two cover portions of an air filter system together. Although a preferred embodiment of this invention has been disclosed, a worker in this art would recognize that many modifications would come within the scope of this invention. For that reason the following claims should be studied to determine the true scope and content of this invention.

What is claimed is:

1. A cover and filter comprising:
   a bottom portion and a top portion with an entrapped vehicle air filter element entrapped between said top and bottom portions; and
   securement structure for securing said top and bottom portions together, said securement structure including a wing member associated with one of said top and bottom portions, and a slot formed on the other of said top and bottom portions, said wing portion snapping to a locked position to overlay a surface adjacent said slot and secure said top and bottom cover portions together.

2. A cover as set forth in claim 1, wherein said wing portion is connected to said one cover portion by a post, and said wing portion moving through said slot with said post being received in said slot after said wing portion has passed through said slot.

3. A cover and filter as set forth in claim 2, wherein said slot and said wing portions have wedged portions which cam said wing portion to pivot in a first direction, said wing portion snapping back in an opposed direction after passing through said slots.

4. A cover as set forth in claim 3, wherein there are a pair of said wing portions spaced on each side of said post.

5. A cover as set forth in claim 3, wherein said post is attached to said one cover portion by a gusset structure extending from an outer surface of said cover portion.

6. A cover as set forth in claim 3, wherein said slot is formed with a flat surface on a side opposed to said wedged surface, and said wing portion is provided with a flat surface on the side opposed to said wedged surface.

7. A cover as set forth in claim 1, wherein said bottom portion and said top portion both enclose said filter element.

8. A cover as set forth in claim 3, wherein said first direction and said opposed direction include pivoting movement in a plane generally perpendicular to a central axis of said wing portion.

* * * * *